Patented Nov. 3, 1942

2,300,472

UNITED STATES PATENT OFFICE 2,300,472

COLORATION OF ARTIFICIAL MATERIALS

Percy Frederick Combe Sowter and Reuben Betteridge, Spondon, near Derby, England, assignors to Celanese Corporation of America, a corporation of Delaware No Drawing. Application January 22, 1938, Serial No. 186,321. In Great Britain February 4, 1937

16 Claims. (Cl. 18—54)

This invention relates to the colouration of artificial filaments, threads, yarns, fibres, ribbons, films, foils and like materials, and particularly to the colouration of such materials having a basis of organic derivatives of cellulose.

Processes have hitherto been described for the manufacture of artificial filaments, threads, ribbons, films and similar materials, wherein such materials are produced by extruding solutions of organic derivatives of cellulose in organic solvents through suitable orifices and coagulating the extruded materials in coagulating baths which contain solvents or swelling agents for the organic derivatives of cellulose. As examples of such processes there may be mentioned those described in U. S. application S. No. 402,785 filed October 26, 1929, now Patent No. 2,147,640, where the coagulating baths contain high concentrations of solvents for the cellulose derivatives of the spinning solutions. In such processes the extruded materials are usually stretched as they pass through the coagulating bath, this operation generally being referred to as "drawing-down" the materials. Processes have also been described wherein artificial filaments, threads, ribbons, films and similar materials having a basis of organic derivatives of cellulose are treated with liquid media containing solvents or swelling agents for the organic derivatives of cellulose and are stretched.

In processes of the above type the artificial filaments and other materials exist in the liquids containing the solvents or swelling agents in a highly swollen condition, and it has now been discovered that the materials may be coloured simultaneously with such processes by incorporating dyestuffs in the said liquids. By this process there may be produced colourations which are very resistant to rubbing and to the action of ordinary scouring baths and it is possible by the new process to obtain deep shades with the aid of dyestuffs from which it is difficult by ordinary processes to obtain deep shades.

According to the present invention, therefore, in the production or treatment of artificial filaments, threads, ribbons, films, foils and other materials having a basis of an organic derivative of cellulose by processes in which the materials are brought to a highly swollen condition by treatment with a liquid which contains a solvent or swelling agent for the organic derivative of cellulose, and the materials are stretched while in that condition, the colouration of the materials is effected by incorporating a dyestuff in the said liquid, or by incorporating a dyestuff component in the said liquid and thereafter converting the said component to a dyestuff on the materials.

The condition in which the materials are treated according to this invention is referred to shortly as a highly swollen condition. It may be described, for example, as the condition in which the materials may be permanently stretched by the application of a very small load, e. g. in the case of artificial filaments a load of about 1 gram per 100 denier. This highly swollen condition may be attained, for example, by treating the materials with a solution of a solvent for the cellulose derivative in a non-solvent therefor, the concentration of the solvent being only a little less than that which would impart to the whole solution a solvent power for the cellulose derivative, e. g. 5 or 10% less.

The invention is primarily concerned with the production of artificial filaments and other materials having a basis of organic derivatives of cellulose by wet spinning processes wherein aqueous coagulating baths containing high concentrations of solvents or swelling agents for the cellulose derivatives are employed. It is also of value in connection with the production of such materials using other coagulating baths. The aqueous coagulating baths employed, as indicated above, are such that the materials passing through them are at least at some stage in a highly swollen condition and preferably the concentration of solvent or swelling agent is such that, under the spinning conditions obtaining, the extruded materials emerge from the coagulating bath in a plastic condition. As organic solvents which may be present in the coagulating baths there may be mentioned diacetone alcohol, diethyl tartrate, ethyl lactate, dioxane or ethers or ether-esters of glycols or glycerine, e. g. monoacetin, diacetin, glycol monoacetate and methyl glycol monoacetate. More volatile solvents, e. g. acetone, may also be employed, but in general it is preferable that the solvents in the coagulating baths should be less volatile than the water or other diluent present in such baths. Mixtures of solvents may be present in the coagulating baths, e. g. mixtures of diacetone alcohol and acetone.

The concentration of the solvent in the coagulating bath is necessarily high in order that the materials passing through it should exist in a highly swollen condition. In general concentrations of the order of 25–65% are satisfactory. The concentration of the solvent may be varied, however, according to the conditions of extrusion and the nature of the spinning solution. As indicated above, it is preferable that the diluent for the solvent in the coagulating bath should be water but other diluents may be employed, e. g. hydrocarbons, alcohols and other liquids which are non-solvents for the organic derivatives of cellulose of the spinning solutions.

If desired, the coagulating baths may contain salts, sugars or other substances capable of reducing the solubility of the solvent in the non-solvent of the coagulating medium. Coagulating baths of this nature are described, for example, in U. S. application S. No. 51,086, filed November 22, 1935, now Patent No. 2,147,642.

As indicated above, one way of carrying out this invention is to incorporate a dyestuff in the coagulating bath. Various dyestuffs may be employed. Of especial value are water-insoluble dyestuffs which exhibit an affinity for cellulose acetate materials when applied in the form of aqueous dispersions, e. g. amino anthraquinone dyestuffs, nitroarylamine and azo dyestuffs. Again, water-soluble dyestuffs which have an affinity for cellulose acetate materials may be employed, e. g. basic dyes. Again, there may be employed dyestuffs which cannot readily be used for dyeing cellulose acetate materials by ordinary processes, e. g. dyestuffs having a direct affinity for cellulose materials. As specific examples of dyestuffs which may be employed there may be mentioned 1-amino-2-methyl anthraquinone, 1-amino-4-phenylamino anthraquinone, 4:4′-diamino 3:3′-dinitrodiphenyl-methane, and the dyestuffs generally which are sold under the trade names "Celliton," "Duranol," "Dispersol" and "Setacyl," e. g. Dispersel Fast Orange G, Setacyl Brilliant Blue, Duranol Red X3BS, and Duranol Brilliant Blue BS. Other water-insoluble dyestuffs which may be employed are, for example, Benzyl Fast Blue GL, Caledon Jade Green, Purpurine, and spirit soluble Nigrosine. Basic dyestuffs such as Magenta and Victoria Blue B may also be employed and Acronol Green gives very satisfactory results. The water-soluble dyestuffs having an affinity for cellulose acetate which are sold under the trade names "Cellit" and "Solacet" may also be employed, e. g. Cellit Fast Violet 4F, Solacet Fast Scarlet BS, Solacet Fast Violet 4RS, Solacet Fast Orange 2GS, Solacet Fast Red 3RS, and Solacet Fast Rubine 3BS. Among miscellaneous dyestuffs which have been found to give very satisfactory results Solway Ultra Blue BS may be specifically mentioned. Mixtures of dyestuffs may be employed, e. g. a mixture of 1-amino-4-phenylamino and 4:4′-diamino-3:3′-dinitrodiphenyl-methane to obtain a green shade.

A further method of effecting colouration of the materials according to this invention is to incorporate in the coagulating bath a compound which, though itself not a dyestuff, may readily be converted to a dyestuff by a further treatment of the extruded materials. Thus, for example, a diazotisable compound may be introduced into the coagulating bath and the extruded materials subsequently subjected to the action of a diazotising agent and a coupling component. Again, a compound capable of coupling with a diazotised compound may be introduced into the coagulating bath and the extruded materials subsequently treated with a diazotised compound or with a diazotisable compound and a diazotising agent. Or, again, there may be introduced into the coagulating bath a diazotisable compound and a coupling component and the extruded materials may subsequently be subjected to treatment to effect diazotisation and coupling.

This last method of forming azo dyestuffs on the materials is of particular value. It is preferable to select azo components and coupling components which may readily be coupled together. Extruded filaments and like materials issuing from the coagulating bath may conveniently be collected by passing them through a washing gutter and then leading them through the usual funnel into a centrifugal spinning box, in accordance with the usual practice in collecting such wet-spun materials, and it is convenient when forming azo dyestuffs on the materials by processes wherein the diazotisable component and the coupling component are applied in the coagulating bath in accordance with this invention, to apply the diazotising agent to the materials as they pass through the funnel. Preferably the materials issuing from the coagulating bath are subjected to washing with plain water prior to their passage through the spinning funnel and the diazotisation and coupling is effected by the application of a nitric solution at the funnel. In general, by this process, the colour starts to develop inside the spinning box.

As examples of diazotisable components and coupling components which may conveniently be applied by this method there may be mentioned as diazotisable components Fast Red B Base and Fast Scarlet GG Base, and as coupling components β-Naphthol, Naphthol AS/G and Naphthol AS/BG. The usual soaping-off treatment applied to textile materials after the formation of azo dyestuffs thereon may be effected by spraying the cake of material collected in the centrifugal spinning box with the washing liquid, e. g. by employing a spinning funnel with the lower end drawn out at right angles and passing the washing liquor down the funnel, thus directing the washing liquor on to the cake.

Another method of colouring artificial filaments or other materials according to this invention is to incorporate in the coagulating bath a leuco compound of a vat dye or a sulphuric acid or other ester of such a leuco compound and to develop the vat dyestuff on the extruded materials. Very satisfactory results have been obtained by the use of the solubilised vat dyestuffs sold under the trade names "Indigosol" and "Soledon." The development of the colour may be effected by the application of the developing agent on the washing gutter, the spinning funnel or in the centrifugal spinning box. A convenient devolping agent is an acidified solution of sodium nitrite and it is found that particularly satisfactory results in respect of the levelness of the dyeing may be obtained by a prolonged treatment of the cake of filaments collected in the spinning box with this solution followed by a rapid washing to carry away loose dyestuff deposited round the edge of the cake of filaments in the spinning box and to remove residual nitrite solution. As examples of Indigosol and Soledon colours which may be applied by this process there may be mentioned Indigosol Pink IR, Indigosol Scarlet IB, Indigosol Golden Yellow IGK, Indigosol Violet ARR, Indigosol Red Violet IRN, Indigosol Olive Green IB, Indigosol Grey IBL, Soledon Red 3BS, Soledon Jade Green and Soledon Golden Yellow GKS. It is preferable to make up the solution of these dyestuffs in the coagulating bath in a dull light as the compounds tend to oxidise in bright light.

The proportion of dyestuff or dyestuff intermediate incorporated in the coagulating bath will depend on the depth of shade required and on the solubility of the dyestuff or dyestuff intermediate in the coagulating bath. In general proportions of 0.1% to 0.5% of dyestuff on the coagulating bath give shades of satisfactory depth and similar proportions of each of the two components applied for the formation of an azo dyestuff on the materials are also satisfactory. In the case of applying esters of leuco compounds of vat dyestuffs, such as those marketed under the names "Indigosol" and "Soledon," higher proportions are, in general, necessary, e. g. proportions of 1% or more on the coagulating bath. The duration of the treatment in the coagulating bath will, in general, be very short, e. g. the materials may pass through the coagulating bath in the space of a few seconds or even less than a second.

In order to facilitate recovery of dyestuff remaining in the spent coagulating liquid it is preferable that the dyestuff employed should be insoluble in the water or other diluent present in the coagulating bath. Where dyestuffs which have only a limited solubility in the solvent present in the coagulating bath and which are substantially insoluble in the diluent present in the bath are employed, the residual dyestuff in the spent coagulating liquid may be recovered by reduction of the concentration of the solvent in such liquid, e. g. by dilution of the liquid or by removal of part of the solvent, whereupon the residual dyestuff is precipitated.

As indicated above, during the coagulation of the materials a stretch or "draw-down" is imparted to them so that in the production of artificial filaments and similar materials products of fine denier are produced from relatively large jet orifices. The lustre of the resulting materials can be varied, e. g. by variation of the relative volatilities and of the concentrations of the solvents or swelling agents and diluents employed in the coagulating bath.

The materials emerging from the coagulating bath may be subjected to any desired after-treatment, e. g. a shrinking treatment. It is, in general, desirable, before collecting the extruded materials, e. g. in the form of cakes or on bobbins or other packages, to remove part of the solvent or swelling agent present in the extruded materials so as to avoid danger of the materials coalescing. Such solvent or swelling agent may be removed by washing with water or other non-solvent medium, or with salt solutions, e. g. in a washing gutter as described above, or by evaporation. Frequently it is of advantage to remove the solvent or swelling agent by washing with a plurality of washing liquids containing successively decreasing proportions of solvents, swelling agents or salts.

The invention has been described above with particular relation to the production of artificial filaments and like materials having a basis of organic derivatives of cellulose by wet spinning processes, wherein the coagulating baths contain dyestuffs. However, as indicated above, the process is also applicable in processes where fully formed artificial filaments or other materials are brought to a highly swollen condition by treatment with liquids containing solvents or swelling agents for the organic derivatives of cellulose and are stretched. Thus very satisfactory colourations may be obtained by incorporating dyestuffs in liquids containing solvents or swelling agents used to facilitate the stretching of such materials or by incorporating dyestuff components in such liquids and thereafter converting such components to the dyestuffs on the materials. The dyestuffs or dyestuff components may be dissolved in the liquids used for facilitating stretching in the same general proportions as described above in connection with coagulating liquids. In general, however, it is desirable in order to obtain shades of good depth to permit the materials to contact with the liquids containing the dyestuffs or dyestuff components for longer periods than when using coagulating liquids for the introduction of the dyestuffs or dyestuff components. Thus periods of contact of 30 seconds or more, e. g. up to two minutes, may be employed.

The invention is particularly applicable to the colouration of artificial filaments, threads, yarns, fibres, ribbons, films, foils and like materials having a basis of cellulose acetate, but may also be applied in the colouration of such materials having a basis of other organic derivatives of cellulose as, for example, other esters of cellulose, e. g. cellulose formate, cellulose propionate and cellulose butyrate, and ethers of cellulose, e. g. methyl cellulose, ethyl cellulose, butyl cellulose and benzyl cellulose, or mixed ethers, mixed esters or mixed ether-esters of cellulose, e. g. ethyl cellulose acetate and oxyethyl cellulose acetate.

The following examples illustrate the invention but are not to be regarded as limiting it in any way:

Example 1

A 20–25% solution of cellulose acetate in acetone is extruded through small circular orifices into a coagulating bath consisting of an aqueous solution containing 45–50% of glycol monoacetate and 0.1% of 4:4'-diamino-3:3'-dinitro-diphenyl-methane. The speed of extrusion and the length of the bath are so adjusted that the filaments produced contact with the bath for about half a second only. The filaments issuing from the bath are washed and dried. They are evenly dyed in a bright yellow shade. Recovery of dyestuff from the spent spinning bath is effected by diluting the bath to 20% glycol monoacetate concentration and filtering off the precipitated dyestuff. The filtrate is then treated with recolourising charcoal.

Example 2

Fast Red B Base and Naphthol AS/BG are dissolved in glycol monoacetate and the glycol monoacetate is diluted with water, the proportions used being such that the solution obtained contains 45–50% of glycol monoacetate, 0.1% of Fast Red B Base and 0.15% of Naphthol AS/BG. Into this solution is extruded, through small circular orifices, a 23% solution of cellulose acetate in acetone. The speed of extrusion and the length of the bath are so adjusted that the filaments produced contact with the bath for about half a second only. The filaments issuing from the bath are led through a spinning funnel into a centrifugal spinning box. At the spinning funnel there is applied to the filaments an aqueous solution containing about 2% of sodium nitrite and about 2% of acetic acid. At the conclusion of the spinning operation a 0.25% soap solution is sprayed on the filaments in the spinning box. The yarn is dyed a deep crimson shade which is fast to scouring treatments.

Example 3

An aqueous coagulating bath is prepared containing 45–50% of glycol monoacetate and 1% of Indigosol Pink IR. A 23% solution of cellulose acetate in acetone is extruded into this solution to form filaments, the extruded filaments contacting with the solution for a period up to 1 second. The filaments issuing from the solution are led through a spinning funnel into a centrifugal spinning box. At the spinning funnel there is applied to the filaments an acidified sodium nitrite solution containing about 0.7% of sodium nitrite and about 0.3–0.4% of hydrochloric acid. The filaments are then well washed to remove traces of nitrite. They are evenly dyed a pink shade.

Example 4

Cellulose acetate yarn is passed during its travel from one bobbin to another through an aqueous solution containing 45–50% of glycol monoacetate and 0.1% of Acronol Green. During its passage through the bath tension is applied to the yarn so as to stretch it by 100% of its length. The apparatus is so arranged that the yarn is in contact with the glycol monoacetate solution for a period of 30 seconds up to 2 minutes, according to the depth of the green shade required. The stretched products are washed and dried and are found to be evenly dyed in a green shade which is fast to rubbing and scouring treatments. The term "coloring agent" employed in the claims is to be understood to mean both a dyestuff for the materials and also a component of a dyestuff for the materials.

Having described our invention, what we desire to secure by Letters Patent is:

1. In the production of artificial filaments, threads, ribbons, films, foils and similar materials by processes in which a solution of an organic derivative of cellulose is extruded into and led through a bath of coagulating liquid containing a high concentration of a solvent or swelling agent for the organic derivative of cellulose for a period of from ½ second to two minutes and the extruded materials are stretched during their passage through such coagulating liquid, the steps of effecting coloration of the extruded materials by incorporating a dyestuff component in the said coagulating liquid and thereafter converting the said component to a dyestuff on the materials.

2. In the manufacture of artificial filaments, threads, ribbons, films, foils and similar materials having a basis of an organic derivative of cellulose by processes in which the materials are brought to a highly swollen condition by immersion in a liquid which contains a solvent or swelling agent for the organic derivative of cellulose for a period of from ½ second to two minutes and the materials are stretched while in that condition, the steps of effecting coloration of the materials by incorporating a diazotizable amine and a coupling component in the said liquid and effecting formation of an azo dyestuff from such reagents on the materials after they issue from the said liquid.

3. In the production of artificial filaments, threads, ribbons, films, foils and similar materials by processes in which a solution of an organic derivative of cellulose is extruded into and led through a bath of coagulating liquid containing a high concentration of a solvent or swelling agent for the organic derivative of cellulose for a period of from ½ second to two minutes and the extruded materials are stretched during their passage through such coagulating liquid, the steps of effecting coloration of the extruded materials by incorporating in the liquid 0.1 to 0.5% of a diazotizable amine and 0.1 to 0.5% of a coupling component on the weight of the liquid and effecting formation of an azo dyestuff from such reagents on the materials after they issue from the coagulating liquid.

4. In the production of artificial filaments, threads, ribbons, films, foils and similar materials by processes in which a solution of cellulose acetate is extruded into and led through a bath of coagulating liquid containing a high concentration of a solvent for swelling agent for the cellulose acetate for a period of from ½ second to two minutes and the extruded materials are stretched during their passage through such coagulating liquid, the steps of effecting coloration of the extruded materials by incorporating in the liquid 0.1 to 0.5% of a diazotizable amine and 0.1 to 0.5% of a coupling component on the weight of the liquid and effecting formation of an azo dyestuff from such reagents on the materials after they issue from the coagulating liquid.

5. In the production of artificial filaments, threads, ribbons, films, foils and similar materials by processes in which a solution of cellulose acetate is extruded into and led through a bath of coagulating liquid containing a high concentration of a solvent or swelling agent for the cellulose acetate for a period of from ½ second to two minutes and the extruded materials are stretched during their passage through such coagulating liquid, the steps of effecting coloration of the extruded materials by incorporating in the liquid a diazotizable amine and a coupling component, passing the materials issuing from the coagulating liquid through a spinning funnel into a centrifugal spinning box and developing an azo dyestuff on the materials by applying a diazotizing solution thereto as they pass through the spinning funnel.

6. In the manufacture of artificial filaments, threads, ribbons, films, foils and similar materials having a basis of an organic derivative of cellulose by processes in which the materials are brought to a highly swollen condition by immersion in a liquid which contains a solvent or swelling agent for the organic derivative of cellulose for a period of from ½ second to two minutes and the materials are stretched while in that condition, the steps of effecting coloration of the materials by incorporating in the liquid a sulphuric acid ester of a leuco compound of a vat dyestuff and developing the vat dyestuff on the materials after they issue from the said liquid.

7. In the production of artificial filaments, threads, ribbons, films, foils and similar materials by processes in which a solution of an organic derivative of cellulose is extruded into and led through a bath of coagulating liquid containing a high concentration of a solvent or swelling agent for the organic derivative of cellulose for a period of from ½ second to two minutes and the extruded materials are stretched during their passage through such coagulating liquid, the steps of effecting coloration of t' e extruded materials by incorporating in the coagulating liquid a sulphuric acid ester of a leuco compound of a vat dyestuff and developing the vat dyestuff on the materials after they issue from the coagulating liquid.

8. In the production of artificial filaments, threads, ribbons, films, foils and similar materials by processes in which a solution of cellulose acetate is extruded into and led through a bath of coagulating liquid containing a high concentration of a solvent or swelling agent for the cellulose acetate for a period of from ½ second to two minutes and the extruded materials are stretched during their passage through such coagulating liquid, the steps of effecting coloration of the materials by incorporating in the liquid about 1% of its weight of a sulphuric acid ester of a leuco compound of a vat dyestuff and effecting development of the vat dyestuff on the materials after they issue from the coagulating liquid.

9. In the production of artificial filaments, threads, ribbons, films, foils and similar materials by processes in which a solution of cellulose acetate is extruded into and led through a bath of a coagulating liquid containing a high concentration of a solvent or swelling agent for the cellulose acetate for a period of from ½ second to two minutes and the extruded materials are stretched during their passage through such coagulating liquid, the steps of effecting coloration of the extruded materials by incorporating in the liquid about 1% of its weight of a sulphuric acid ester of a leuco compound of a vat dyestuff, passing the materials issuing from the coagulating liquid into a centrifugal spinning box and developing the vat dyestuff on the materials while they are in said box.

10. In the manufacture of artificial filaments, threads, ribbons, films, foils and similar materials having a basis of an organic derivative of cellulose, the steps of bringing the materials to a highly swollen condition by immersing them for a period of from ½ second to two minutes in a liquid which contains a solvent or swelling agent for the cellulose derivative and, in solution, a coloring agent for the organic derivative of cellulose and stretching the materials while they are in said highly swollen condition.

11. In the production of artificial filaments, threads, ribbons, films, foils and similar materials having a basis of an organic derivative of cellulose, the steps of extruding a solution of an organic derivative of cellulose through a shaping device into a bath of coagulating liquid containing 25–65% of a solvent or swelling agent for the cellulose derivative and, in solution, a coloring agent for the cellulose derivative and stretching the materials during their passage through the coagulating liquid and withdrawing the materials from said coagulating liquid after immersion therein for a period of from ½ second to one second.

12. In the production of artificial filaments, threads, ribbons, films, foils and similar materials having a basis of cellulose acetate, the steps of extruding a solution of cellulose acetate through a bath of shaping device into a coagulating liquid containing 25–65% of a solvent or swelling agent for the cellulose acetate and, in solution, a coloring agent for the cellulose acetate and stretching the materials during their passage through the coagulating liquid and withdrawing the materials for said coagulating liquid after immersion therein for a period of from ½ second to one second.

13. In the production of artificial filaments, threads, ribbons, films, foils and similar materials having a basis of cellulose acetate, the steps of extruding a solution of cellulose acetate through a shaping device into a bath of coagulating liquid containing 45–50% of glycol monoacetate and, in solution, a coloring agent for the cellulose acetate and stretching the materials during their passage through the coagulating liquid and withdrawing the materials from said coagulating liquid after immersion therein for a period of from ½ second to one second.

14. In the manufacture of artificial filaments, threads, ribbons, films, foils and similar materials having a basis of an organic derivative of cellulose, the steps of bringing the materials to a highly swollen condition by immersing them for a period of from ½ second to two minutes in a liquid which contains 25 to 65% of a solvent or swelling agent for the cellulose derivative and, in solution, a water-insoluble dyestuff having affinity for the materials and stretching the materials while they are in said highly swollen condition.

15. In the production of artificial filaments, threads, ribbons, films, foils and similar materials having a basis of an organic derivative of cellulose, the steps of extruding a solution of an organic derivative of cellulose through a shaping device into a bath of coagulating liquid containing 25 to 65% of a solvent or swelling agent for the cellulose derivative and, in solution, a water-insoluble dyestuff having affinity for the materials, stretching the materials during their passage through the coagulating liquid and withdrawing the materials from said coagulating liquid after immersion for a period of from ½ to one second.

16. In the production of artificial filaments, threads, ribbons, films, foils and similar materials having a basis of cellulose acetate, the steps of extruding a solution of cellulose acetate into a bath of coagulating liquid containing 25–65% of a solvent or swelling agent for the cellulose acetate and, in solution, 0.1–0.5%, based on the weight of the coagulating liquid, of a water-insoluble dyestuff having affinity for cellulose acetate, stretching the materials during their passage through the coagulating liquid and withdrawing the materials from said coagulating liquid after immersion for a period of from ½ to one second.

PERCY FREDERICK COMBE SOWTER.
REUBEN BETTERIDGE.